United States Patent [19]
Nobe

[11] Patent Number: 5,805,194
[45] Date of Patent: Sep. 8, 1998

[54] THERMAL PRINTER HAVING A MULTICOLORED PRINTING FUNCTION

[75] Inventor: Nobuyuki Nobe, Tokyo, Japan

[73] Assignee: Max Co., Ltd., Tokyo, Japan

[21] Appl. No.: 655,645

[22] Filed: Jun. 30, 1996

[30] Foreign Application Priority Data

May 31, 1995 [JP] Japan .................................. 7-134387

[51] Int. Cl.⁶ .................................................. B41J 2/525
[52] U.S. Cl. ........................................................ 347/172
[58] Field of Search .................................. 347/9, 12, 41, 347/43, 115, 131, 254, 172, 174, 176; 358/296, 460, 524; 359/731; 399/85; B41J 2/525

[56] References Cited

U.S. PATENT DOCUMENTS 4,905,091  2/1990  Suzuki et al. ............................ 347/900

Primary Examiner—N. Le
Assistant Examiner—L. Anderson
Attorney, Agent, or Firm—Jacobson, Price, Holman & Stern, PLLC

[57] ABSTRACT

A thermal printer is provided which comprises a keyboard (1) by which characters to be printed in each printing space of a sheet and colors of the characters are input, a memory (9) for storing information about the characters and colors input by the keyboard (1), and a CPU (8) by which the characters stored in the memory (9) are classified by color in accordance with predetermined chromatic priority and are read out and then are transferred to a printer unit (3). The printer unit (3) includes a printing control unit (14) for causing the printer to print the read-out characters whenever the characters are read out by color difference.

3 Claims, 4 Drawing Sheets

| COLUMN | ROW | CHARACTER | SIZE | COLOR-ATTRIBUTE |
|---|---|---|---|---|
| 1 | 1 | A | .... | ① |
|   | 2 | 1 | .... | ① |
|   | ⋮ |   |   |   |
| 2 | 1 | B | .... | ② |
|   | 2 | 2 | .... | ② |
|   | ⋮ |   |   |   |
| 3 | 1 | C | .... | ③ |
|   | 2 | 3 | .... | ① |
|   | ⋮ |   |   |   |
| 4 | 1 | D | .... | ② |
|   | 2 | 4 | .... | ③ |
|   | ⋮ |   |   |   |

FIG. 2

THERMAL PRINTER HAVING A MULTICOLORED PRINTING FUNCTION

BACKGROUND OF THE INVENTION

1. Field of the Invention

This invention relates to a thermal printer having a multicolored printing function.

2. Description of the Prior Art

Conventionally, a thermal printer is known in which characters of a document are printed in various colors by exchanging ink ribbon cassettes varying in color for each other.

In this type of thermal printer, color designating data is beforehand inserted before character data a color of which must be changed, and printing operations are temporarily stopped immediately before a character required to change its color is printed. At that time, a message, such as "Exchange the present ink ribbon cassette for the red ink ribbon cassette.", is displayed.

According to the message, a user exchanges the ink ribbon cassette for another one and, when the user operates a printing execution key, printing is resumed from the position where the operations are temporarily stopped, so that the character of the document is printed in a different color. This conventional thermal printer is capable of printing characters in various colors by having an automatic temporary stopping function and a message displaying function.

As mentioned above, in the conventional thermal printer, printing operations are temporarily stopped immediately before a character a color of which should be changed is printed. Therefore, if a black character and a red character are alternately printed in a document, printing is temporarily stopped whenever the characters are printed one by one, and a black ink ribbon cassette (or red ink ribbon cassette) must be exchanged for a red ink ribbon cassette (or black ink ribbon cassette). Accordingly, disadvantageously, the work efficiency of printing is very low and, in addition, much time is taken until the printing of the document is completed.

SUMMARY OF THE INVENTION

It is an object of the present invention to provide a thermal printer which is capable of enhancing the work efficiency of printing and capable of shortening a printing time by minimizing the number of times of temporary stops of printing and the number of times of the exchange of ink ribbon cassettes for each other.

The present invention is characterized in that, in a thermal printer comprising a character inputting means for inputting characters to be printed in each printing space of a sheet and a character printing means for printing the characters in the printing space while feeding the sheet, the thermal printer further comprises a color inputting means for inputting respective colors of the characters to be printed in each printing space, a memory means for storing information about the colors input by the color inputting means together with information about the characters input by the character inputting means, a readout means for, in accordance with predetermined chromatic priority, classifying the characters stored in the memory means by color and reading out the characters, and a control means for causing the character printing means to print the read characters whenever the characters are read out by the readout means according to color differences.

BRIEF DESCRIPTION OF THE DRAWINGS

FIG. 2 is a descriptive drawing of printing data which is stored in a memory of FIG. 1.

DETAILED DESCRIPTION OF THE EMBODIMENT

An embodiment of a thermal printer according to the present invention will be described hereinafter with reference to the attached drawings.

Figure 1:
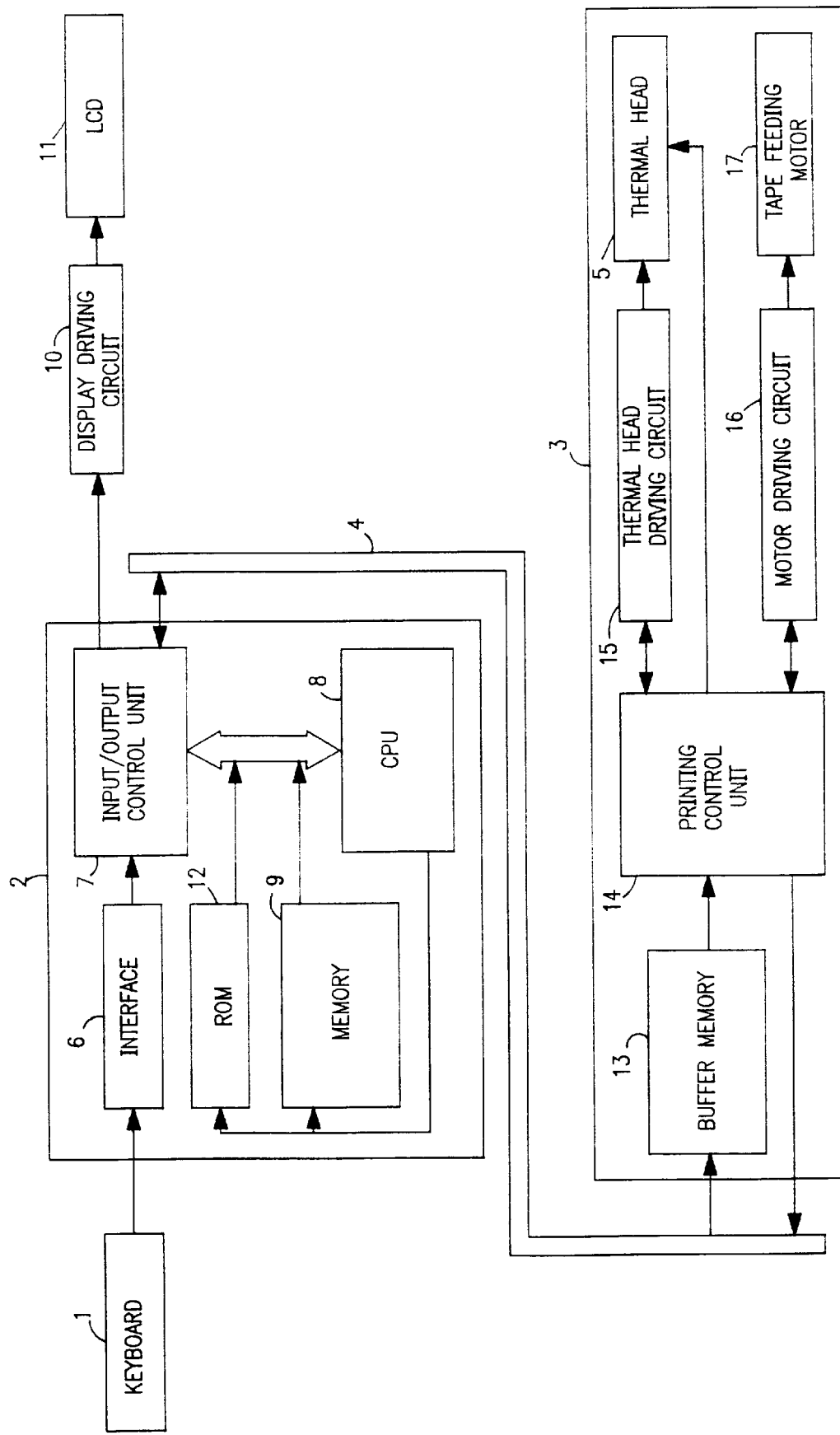
FIG. 1 is a block diagram showing a construction of a thermal printer according to the present invention.

FIG. 1 is a block diagram showing a construction of the thermal printer in which characters are printed on a tape (sheet), a sheet film, or the like for making a lettering tape. The thermal printer comprises a keyboard 1, a processor 2, a printer unit 3 connected to the processor 2 via a cable 4, and a display 11 of an LCD.

Figure 4A:
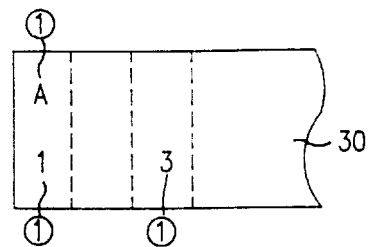
FIGS. 4(a), 4(b), 4(c), and 4(d) are descriptive drawings showing the printing order according to which characters are printed in respective colors.
Figure 4B:
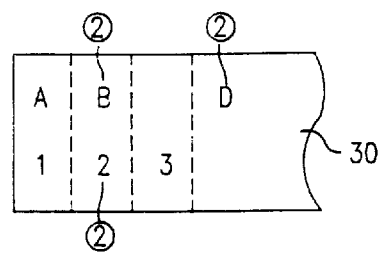
Figure 4C:
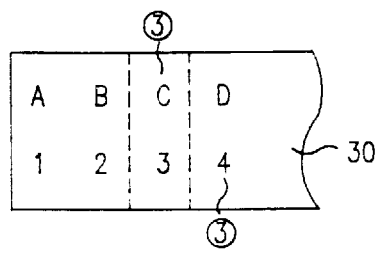
Figure 4D:
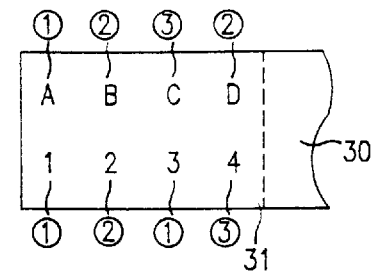

When characters "A B C D" and "1 2 3 4", for example, are printed on a tape 30 as shown in FIG. 4(d), the keyboard 1 is used to input columns and rows designating a printing position (printing space) or is used to input letters, numbers, signs, or symbols, such as "A B C D" or "1 2 3 4". In addition, when characters "A B C D" and "1 2 3 4", for example, are printed in their respective colors, those colors are input by means of the keyboard 1.

The processor 2 comprises an interface 6, an input/output control unit 7, a CPU 8, a memory 9, and a ROM 12. Data input by the keyboard 1 to the processor 2 is read in the CPU 8 via the interface 6 and the input/output control unit 7. The data read in the CPU 8 is then written into a character data area of the memory 9. The CPU 8 controls a display driving circuit 10 so that the data input by the keyboard 1 is displayed on the screen of the display 11. As shown in FIG. 2, a character data area 20 is set in the memory 9. The character data area 20 includes a character area 23 in which characters are stored corresponding to columns 21 and rows 22 which designate their respective printing positions, a size area 24 which designates the respective sizes of the characters to be printed, and a color-attribute area 25 which designates the respective colors of the characters to be printed.

In addition to a control program and the like required for printing the characters, the ROM 12 stores color numbers designating the priority in color of the characters. For example, if the priority is set in order of red, blue, yellow, green, and black, color numbers ①, ②, ③, ④, and ⑤ are stored corresponding to the order of red, blue, yellow, green, and black. Additionally, the ROM 12 includes a retrieval program for retrieving character data in the order of the color numbers, a stopping program for temporarily stopping printing when an ink ribbon cassette is exchanged for another, and a message displaying program for displaying a message of an exchange of the ink ribbon cassettes.

The printer unit 3 comprises a thermal head 5 large enough to cover the whole width of a tape or the like, a buffer memory 13, a printing control unit 14, a thermal head driving circuit 15, a motor driving circuit 16, and a tape feeding motor 17.

When printing execution instructions are input by means of the keyboard 1, the CPU 8 reads out character data from the character data area 20 of the memory 9 and, based on the printing control program stored in the ROM 12, performs the processing of the character data into dot data. Printing data generated by this processing is transferred to the printer unit 3. The transferred printing data is stored in the buffer memory 13 of the printer unit 3. Based on a control clock signal, the control unit 14 transfers the printing data to the thermal head 5 and drives the thermal head driving circuit 15 and the motor driving circuit 16 synchronously. As a result, the thermal head 5 and the tape feeding motor 17 are driven to carry out printing.

Figure 3:
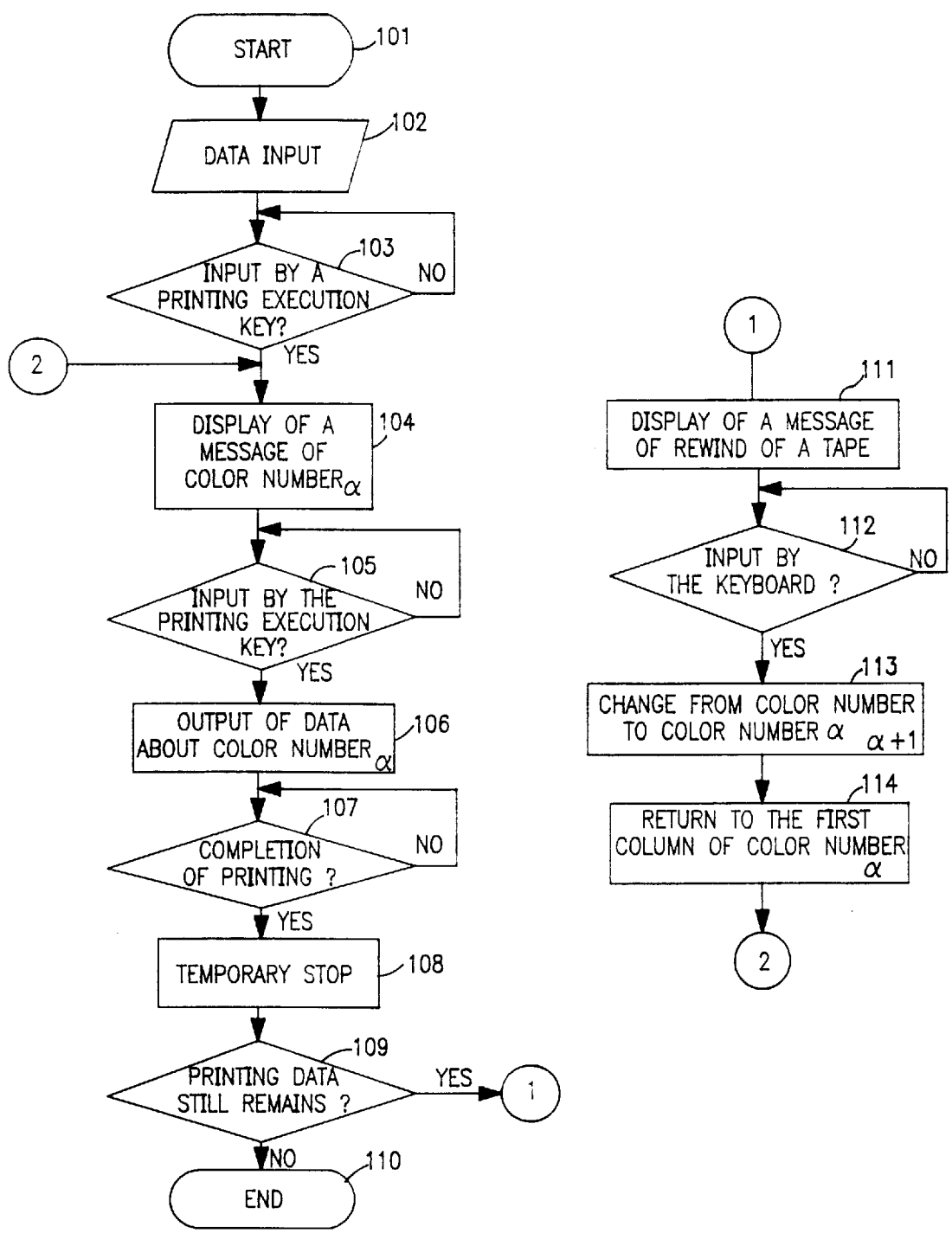
FIG. 3 is a flowchart showing the operation of the thermal printer of FIG. 1.

The operation of the thermal printer will now be described with reference to the flowchart of FIG. 3.

First, a power source is turned on (Step 101). After a print format, such as a row pitch, is set, the printing position, character data, character size, and color of a character to be printed are input by means of the keyboard 1 (Step 102).

For example, when "A B C D" and "1 2 3 4" are printed as shown in FIG. 4(d), the print format is set first, and then a column and a row which define a printing position are designated. After that, a character to be printed in the designated printing position is input. In this case, 1st column and 1st row are designated and character "A" is input. If the color of character "A" is red, "red" is input by means of the keyboard 1. Subsequently, 1st column and 2nd row are designated and character "1" is input. If the color of character "1" is red, "red" is input by means of the keyboard 1.

Likewise, for the 1st and 2nd rows of 2nd column, characters "B" and "2" are input, respectively. For the 1st and 2nd rows of 3rd column, characters "C" and "3" are input, respectively. For the 1st and 2nd rows of 4th column, characters "D" and "4" are input, respectively. The respective colors of the characters are also input. In this case, characters "B", "D", and "2" are blue, and characters "C" and "4" are yellow.

Data about the thus input characters is stored in the character data area 20 of the memory 9 shown in FIG. 2. Data about their colors is stored in the color-attribute area 25 of the character data area 20 in the form of a color number. In this case, since red, blue, and yellow are input, color numbers ①, ②, and ③ corresponding to the respective characters are stored in the color-attribute area 25.

At Step 103, a judgment is made about whether the printing execution key of the keyboard 1 has been operated or not. If not, the stage again returns to Step 103. In other words, waiting at Step 103 lasts until the printing execution key is operated.

When the printing execution key is operated, a "yes" judgment is made at Step 103, and the stage proceeds to Step 104. At Step 104, color number a first-ranked in the priority is retrieved from the color-attribute area 25 of the character data area 20 stored in the the memory 9. A message of a color is displayed which corresponds to the retrieved color number. In this case, since color number ① is ranked first, color number ① is retrieved, and a message is displayed which shows a red ink ribbon corresponding to color number ①. For example, the message "Exchange for the No.1 ink ribbon cassette." is displayed on the screen of the display 11.

According to the message, a user exchanges the present ink ribbon cassette for the No.1 ink ribbon cassette which is a red ink ribbon cassette. At Step 105, a judgment is again made about whether the printing execution key of the keyboard 1 has been operated or not. If not, the stage again returns to Step 105, and waiting at Step 105 lasts until the printing execution key is operated.

When the printing execution key is operated, a "yes" judgment is made at Step 105, and the stage proceeds to Step 106. At Step 106, the display of the message is completed, and only the character data about color number ① is read out from the memory 9. In detail, the character data about "A", "1", and "3" shown in FIG. 2 is read out. The character data about these characters is transferred to the printer unit 3 and is stored in the buffer memory 13. Based on the character data stored in the buffer memory 13, the printing control unit 14 controls the thermal head driving circuit 15 and the motor driving circuit 16 in order to carry out printing. As a result, as shown in FIG. 4(a), character "A" is printed at the 1st row of the 1st column of the tape 30, character "1" is printed at the 2nd row of the 1st column of the tape 30, and character "3" is printed at the 2nd row of the 3rd column of the tape 30 in red by means of the red ink ribbon.

At Step 107, a judgment is made about whether all the red characters of color number ① have been printed or not. If not, the stage returns to Step 107, and waiting at Step 107 lasts until all of the red characters are printed.

When all of the red characters are printed, a "yes" judgment is made at Step 107, and the stage proceeds to Step 108.

At Step 108, the control of the thermal head driving circuit 15 and the motor driving circuit 16 is stopped by the control unit 14, and thereby printing is stopped. Subsequently, at Step 109, a judgment is made about whether all the character data stored in the memory 9 has been transferred or not. In other words, a judgment is made about whether all the characters input by the keyboard 1 have been printed or not. If all the characters input thereby have been printed, a "no" judgment is made because no character data remains. The stage proceeds to Step 110, and printing is completed.

If some character data still remains in the memory 9, in other words, if all the characters input by the keyboard 1 have not yet been printed, a "yes" judgment is made at Step 109, and the stage proceeds to Step 111.

At Step 111, for example, the message "Rewind the tape." is displayed on the screen of the display 11. At Step 112, a judgment is made about whether instructions to rewind the tape 30 according to the message of the display 11 have been input by the keyboard 1 or not. If not, the stage returns to Step 112, and waiting lasts at Step 112 until the instructions to rewind the tape 30 are input.

When the instructions to rewind the tape 30 are input, a "yes" judgment is made at Step 112, and the stage proceeds to Step 113. At Step 113, the color number is changed to the next-ranked color number. In this case, color number ① is changed to color number ②, and columns of the second-ranked color number are retrieved from the color-attribute area 25 of the character data area 20 stored in the the memory 9. In this case, since color number ② exists in the second and fourth columns, the second and fourth columns are retrieved. If color number ② does not exist anywhere, columns of the third-ranked color number (color number ③) are retrieved.

At Step 114, the tape feeding motor 17 is reversely driven until the thermal head 5 is positioned at a column smaller or precedent in number of color number ②. In this case, the tape feeding motor 17 is reversely driven until the thermal head 5 is positioned at the 2nd column (not 4th column) of color number ②. Subsequently, the stage proceeds to Step 104, At Step 104, a message is displayed which shows a blue ink ribbon corresponding to color number ② to which color number ① has been changed. For example, the message "Exchange for the No. 2 ink ribbon cassette." is displayed on the screen of the display 11.

At Steps 105 and 106, as shown in FIG. 4(*b*), character "B" is printed at the 1st row of the 2nd column of the tape 30, character "2" is printed at the 2nd row of the 2nd column of the tape 30, and character "D" is printed at the 1st row of the 4th column of the tape 30 in blue by means of the blue ink ribbon.

Likewise, by repeating the procedures of Steps 104–114, character "C" is printed at the 1st row of the 3rd column of the tape 30, and character "4" is printed at the 2nd row of the 4th column of the tape 30 in yellow by means of the yellow ink ribbon as shown in FIG. 4(*c*). As a result, as shown in FIG. 4(*d*), a lettering tape 31 printed in the colors is made.

Accordingly, since the same colored characters ranging from the 1st column to the last column are printed, there is no need of the exchange of an ink ribbon cassette for another by stopping printing whenever characters in each column are printed as in the conventional thermal printer, regardless of whether the colors of the characters vary in each column. This makes it possible to greatly shorten a printing time. Additionally, exchanging operations of ink ribbon cassettes are lightened and therefore printing efficiency is greatly enhanced because the number of times of exchange of an ink ribbon cassette for another depends on the number of colors to be printed.

Moreover, at Step 114, the tape 30 is rewound to a column from which printing is resumed, not always to the 1st column. This makes it possible to lessen the quantity of an ink ribbon wound up following the movement of the tape 30 when printing is carried out. Accordingly, a waste of the ink ribbon is prevented.

In the above embodiment, a description was given of a case in which characters are printed. However, symbols, signs, or figures may be printed instead of the characters.

What is claimed is:

1. A thermal printer comprising:

character inputting means for inputting characters to be printed in each printing space of a sheet;

printing means for printing said characters in said each printing space while feeding said sheet;

color inputting means for inputting colors of said characters;

memory means for storing data about said colors input by said color inputting means together with data about said characters input by said character inputting means;

readout means for reading out the character data stored in said memory means by classifying said characters by color in accordance with predetermined chromatic priority;

control means for causing said printing means to print the readout characters whenever said characters are classified by color and read out by said readout means; and rewind control means for controlling rewind of said sheet so that said printing means is positioned at a place from which printing is resumed after completion of printing of the characters read out by said readout means and when characters which rank in the predetermined chromatic priority next to the characters which have been printed are read out and printed.

2. A thermal printer according to claim 1, further comprising display means for, when said characters are read out by said readout means, displaying a message which shows colors of the read-out characters.

3. A thermal printer according to claim 2, wherein a message showing a next-ranked color in the predetermined chromatic priority is displayed on said display means when said printing means is positioned at said place from which printing is resumed and, by operating an execution key on the character inputting means, characters of the next-ranked color begin to be printed.

* * * * *